(No Model.)
R. R. NEILD.
TOOL HOLDER FOR PLANING MACHINES.
No. 318,646. Patented May 26, 1885.
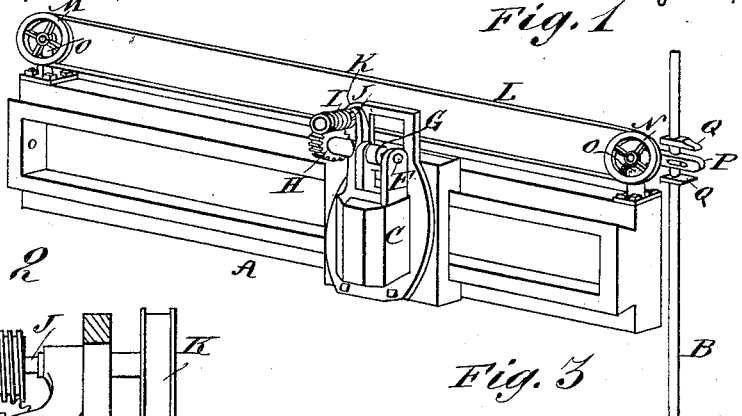
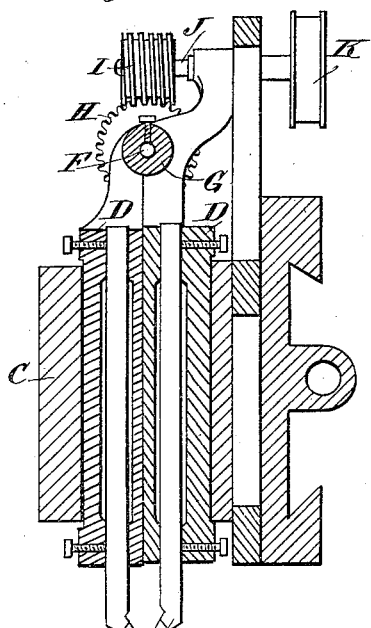
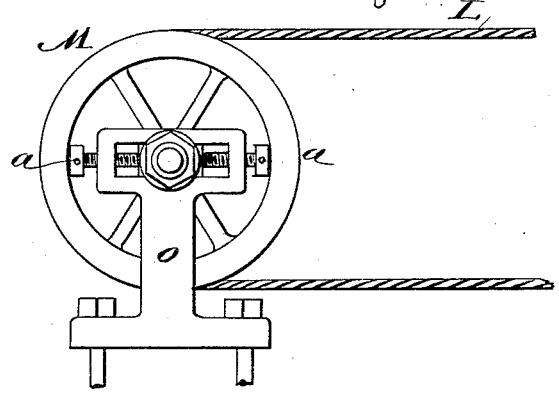
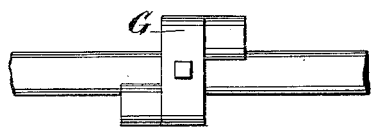
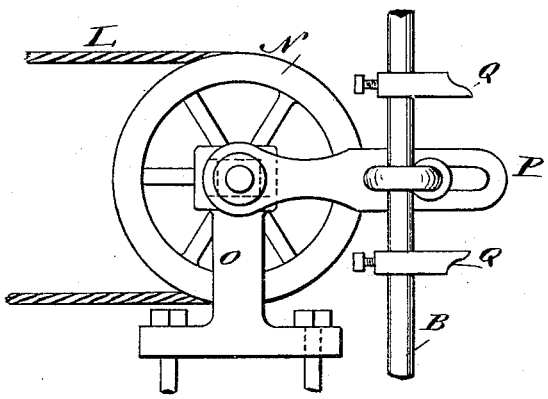
WITNESSES:
C. Neveux
C. Sedgwick
INVENTOR:
R. R. Neild
BY Munn & Co
ATTORNEYS.

United States Patent Office.

ROBERT R. NEILD, OF STRATFORD, ONTARIO, CANADA.

TOOL-HOLDER FOR PLANING-MACHINES.

SPECIFICATION forming part of Letters Patent No. 318,646, dated May 26, 1885.

Application filed December 29, 1884. (No model.) Patented in Canada February 7, 1884, No. 18,622.

*To all whom it may concern:*

Be it known that I, ROBERT R. NEILD, of Stratford, in the county of Perth, Province of Ontario, and Dominion of Canada, have invented a new and useful Improvement in Tool-Holders for Iron-Planing Machines, of which the following is a full, clear, and exact description.

The object of my invention is to provide a tool-box to hold two cutting-tools, one arranged to cut while the table is moving in one direction, and the other to cut when the table is moving in the reverse direction, the said tool being thrown in and out of action automatically by the movement of the rod which causes the tool-box to travel across the cross-head.

Reference is to be had to the accompanying drawings, forming a part of this specification, in which similar letters of reference indicate corresponding parts in all the figures.

Figure 1 is a perspective view showing the cross-head of a planing-machine with the improved tool-box and its attachment in position. Fig. 2 is a vertical section of the tool-box in larger size. Fig. 3 is a side view of the pulley and bracket located on the left-hand side of the cross-head. Fig. 4 is a side elevation of the pulley which adjusts the tool and its connection to the feed-rod. Fig. 5 is a detail of the spindle and its cams for adjusting the tools.

A is the ordinary cross-head of a planing-machine. B is the ordinary feed-rod. C is the body of the tool-box, containing, as indicated in Fig. 2, two sliding tool-holders, D, into which the tools E are secured with their edges pointing in opposite directions.

F is a spindle journaled on the top of the tool-box C, and having fixed to it the double cam G. One half of this cam fits into a suitable bearing formed in one tool-holder D, while the other half fits into a corresponding bearing formed in the other tool-holder D, and the arrangement is such that when the spindle F is turned one tool-holder is moved upwardly, while the other tool-holder has a reverse or downward movement. Consequently it is only necessary to turn the spindle F the required distance in order to raise one tool E clear of the work and throw the other tool E into action. In order to effect this purpose at the proper place—namely, at each end of the stroke of the tool-box—there is fixed to the end of spindle F a spur-wheel, H, that meshes with a worm-pinion, I, fixed to a spindle, J, which is suitably journaled on the tool-box at the top. On this spindle J is a fixed pulley or cord-wheel, K, around which is wound an endless cord that also extends to and around two cord-pulleys, M and N, located on the opposite end of cross-head A. The cord-pulley M is carried by a slotted bracket, O, that is fixed on cross-head A, the spindle of the pulley being held in the slot by set-nuts *a*, whereby the adjustment of pulley M is permitted for loosening and tightening the cord L. The cord-pulley N, located at the other end of the cross-head, is carried by a bracket, and is provided with an arm, P, extending past the feed-rod B.

There are two dogs, Q, fixed on feed-rod B, one above and the other below the arm P.

The feed-rod B, as is well known, moves vertically during the operation of the machine at each end of the stroke, so as to impart side motion to tool-box C. By fixing to this feed-rod the two dogs Q, one at each side of the arm P, each vertical movement of the feed-rod will cause either one or the other of the dogs Q to come in contact with arm P, and in that way give the desired movement to cord L through the motion of pulley N, and as the cord is wound on pulley K a rotary movement is given to spindle J, and the double cam G is operated to cause one tool to rise while the other is thrown down into action.

Having thus described my invention, I claim as new and desire to secure by Letters Patent—

1. The tool-holders D, held to have movement vertically in the tool-box C, in combination with a cam arranged to act upon the said tool-holders to reciprocate the same, and mechanism for operating the cam, substantially as and for the purpose set forth.

2. The tool-holders D, held within the tool-box C, in combination with the double cam G, spindle F, spur-wheel H, and worm-pinion I, connected to some reciprocating part of the machine, substantially as described.

3. The tool-holders D, held within the tool-box C, the double cam G and spindle F on the tool-box, spur-wheel H, worm-pinion I, spindle J, and pulley K, in combination with cord L, and pulleys M and N, the said pulleys deriving motion from the reciprocating motion of feed-rod B, that is provided with dogs set to come alternately in contact with arm P, substantially as and for the purpose specified.

ROBERT R. NEILD.

Witnesses:
J. STEWARD,
GEO. THOMPSON.